US009195566B2

(12) United States Patent
Huang et al.

(10) Patent No.: US 9,195,566 B2
(45) Date of Patent: Nov. 24, 2015

(54) DEFECT ANALYSIS SYSTEM FOR ERROR IMPACT REDUCTION

(71) Applicant: International Business Machines Corporation, Armonk, NY (US)

(72) Inventors: Wei Huang, Austin, TX (US); Jian Li, Austin, TX (US); Su Liu, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/740,890

(22) Filed: Jan. 14, 2013

(65) Prior Publication Data

US 2014/0201573 A1 Jul. 17, 2014

(51) Int. Cl.
*G06F 11/00* (2006.01)
*G06F 11/36* (2006.01)

(52) U.S. Cl.
CPC .................................. *G06F 11/362* (2013.01)

(58) Field of Classification Search
CPC ............ G06F 11/3604; G06F 11/3616; G06F 11/3608; G06F 11/3664; G06F 11/362
USPC .......................................... 714/38.1; 717/124
See application file for complete search history.

(56) References Cited

U.S. PATENT DOCUMENTS

| | | | |
|---|---|---|---|
| 7,856,616 B2 | 12/2010 | Chang et al. | |
| 7,870,535 B2 | 1/2011 | Rippert et al. | |
| 7,996,723 B2 * | 8/2011 | Levine et al. | 714/38.1 |
| 8,151,248 B1 | 4/2012 | Butler et al. | |
| 8,296,724 B2 * | 10/2012 | Lindley | 717/104 |
| 2005/0091003 A1 * | 4/2005 | Wu | 702/183 |
| 2006/0107191 A1 * | 5/2006 | Hirooka et al. | 714/796 |
| 2010/0180259 A1 | 7/2010 | Lindley | |
| 2010/0241469 A1 | 9/2010 | Weigert | |
| 2010/0281307 A1 * | 11/2010 | Ng | 714/40 |
| 2011/0161933 A1 | 6/2011 | Hudson | |
| 2014/0053135 A1 * | 2/2014 | Bird et al. | 717/124 |

OTHER PUBLICATIONS

Jose, Manu et al., "Cause Clue Clauses: Error Localization using Maximum Satisfiability," SIGPLAN Not. vol. 46 Issue 6, Jun. 2011, pp. 437-446.

(Continued)

*Primary Examiner* — Philip Guyton
(74) *Attorney, Agent, or Firm* — DeLizio Law, PLLC (57) ABSTRACT

An apparatus includes a network interface, memory, and a processor. The processor is coupled with the network interface and memory. The processor is configured to analyze a first set of data associated with a plurality of data sources. Analyzing the first set of data associated with the plurality of data sources determines a plurality of relationships among the first set of data. The processor is configured to store indications of the plurality of relationships among the first set of data. An indication of a relationship indicates a possible software defect. The processor is configured to generate rules based, at least in part, on the first set of data associated with a plurality of data sources. A rule indicates a possible software defect.

21 Claims, 7 Drawing Sheets

(56) References Cited

OTHER PUBLICATIONS

Konighofer, Robert et al., "Automated Error Localization and Correction for Imperative Programs", Formal Methods in Computer Aided Design (FMCAD), Oct. 30, 2011-Nov. 2, 2011, pp. 91-100.

Pietrzak, Pawel et al., "Automatic Binding-related Error Diagnosis in Logic Programs", In Proceedings of the 23rd international conference on Logic programming (ICLP'07), Vemica Dahl and Ilkka Niemel (Eds.). Springer-Verlag, Berlin, Heidelberg, 2007, pp. 333-347.

* cited by examiner

DEFECT ANALYSIS SYSTEM FOR ERROR IMPACT REDUCTION

BACKGROUND

Embodiments of the inventive subject matter generally relate to the field of computers, and, more particularly, to defect analysis and defect prevention.

Tracking down the root cause for a defect (or "bug") in even simple software can be a challenging endeavor. As software increases in complexity, the difficulty in fixing defects can increase at a rate that might be characterized as exponential, or worse. A single defect may take weeks or months to be fixed, and then weeks or months before the fix is incorporated into a software release and made available to users.

SUMMARY

Embodiments of the inventive subject matter generally include a method analyzing a first set of data associated with a plurality of data sources. Analysis of the first set of data associated with the plurality of data sources determines a plurality of relationships among the first set of data. Indications of the plurality of relationships among the first set of data are stored, and the indications of a relationship indicate a possible software defect. Rules are generated based, at least in part, on the first set of data associated with the plurality of data sources. A rule also indicates a possible software defect.

Embodiments of the inventive subject matter also generally include a method in which sets of interrelated data are determined. The number of software defects is decreased by analyzing a modification of data associated with a first set of interrelated data of the sets of interrelated data. The amount of time between receiving an indication of a software defect and determining a cause of the software defect is decreased by analyzing the sets of interrelated data.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to k-means clustering, other analysis techniques may be utilized. In other instances, well-known instruction instances, protocols, structures and techniques have not been shown in detail in order not to obfuscate the description.

Much of the difficulty related to software defects stems from the fact that complex software has complex relationships between components that are built on top of each other in layers. To track down a defect, it is useful to understand the relationships between the components, as well as understanding how changes to various components can manifest in related components. Although the human brain is good at recognizing relationships, it can be difficult to recognize all relevant relationships in complex software.

Additionally, software components can be used in multiple different software applications that are completely unrelated in function. However, the different software applications may use one or more of the same underlying components. A defect in one of the software applications may already be solved for one software application, but this fact may go unknown to the support engineer working on the defect related to the other software applications.

Furthermore, it can be virtually impossible for a developer to verify that all changes to all components will have no impact on the software the developer is responsible for. Each component the developer uses may be based on multiple additional components, each of which may be based on multiple additional components, etc. Thus, there can be too many interactions to fully understand the impact of a single change in a component that is obscured by multiple layers of other software.

A defect analysis system can be designed to aggregate software-related data from multiple sources, analyze relationships among the data and provide access to the results of the analysis for use in fixing and preventing software defects. The defect analysis system can analyze large amounts of data, thus exposing relationships that were not previously visible or were difficult to discern. The defect analysis system can also be designed to analyze changes in the datasets and notify owners of related data that a change has been made that might impact the related data. Furthermore, the defect analysis system can be integrated into other systems, generating or updating rules and other process constraints to help further prevent defects.

By providing access to more relationships, the defect analysis system can reduce the amount of time between receiving a report of a defect and determining the cause of the defect. By notifying stakeholders of changes to related data, the defect analysis system can reduce the number of defects. And by applying generated rules and other process constraints, the defect analysis system can stop processes that may introduce defects.

Figure 1:
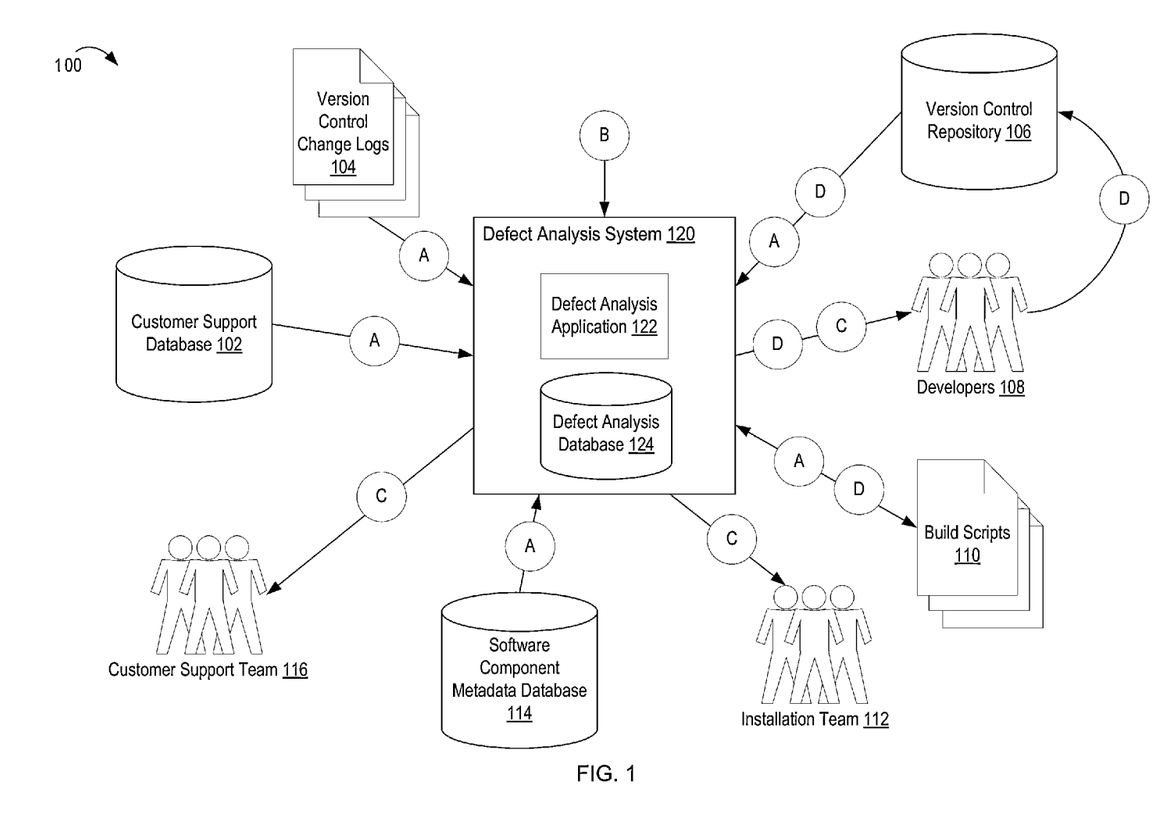
FIG. 1 is a conceptual diagram that depicts the interactions between a defect analysis system, data sources and system participants.

FIG. 1 is a conceptual diagram that depicts the interactions between a defect analysis system, data sources and system participants. FIG. 1 depicts a defect analysis system environment 100, with data sources that include a customer support database 102, a set of version control change logs 104, a version control repository 106, a set of build scripts 110, and a software component metadata database 114. The defect analysis system environment 100 also includes a customer support team 116, a set of developers 108 and an installation team 112, which constitute system participants. Last, the defect analysis system environment 100 also includes a defect analysis system 120 comprising a defect analysis application 122 and a defect analysis database 124.

At stage A, data contained in the data sources, such as the customer support database 102 and the version control repository 106, are input into the defect analysis system 120. This can be accomplished in a variety of ways, and depends on the specific implementation of the defect analysis system 120 and the individual data sources. For example, the data in the data source can be exported to a file or plurality of files, then imported into the defect analysis system 120. The defect analysis system 120 can also connect to the data source and extract the data by utilizing an application programming interface (API).

The data sources can provide data in various formats. For example, a data source can be a relational database in which the data already has some relationships defined. The customer support database 102 is an example of a data source that might be implemented as a relational database. A data source can also include unordered data without defined relationships. For example, the version control repository 106 can contain a set of files containing computer code, with no explicit relationships between the files defined in the version control repository 106.

The defect analysis application 122 can act as the interface between the data sources and the defect analysis database 124. For example, the defect analysis application 122 can connect to the customer support database 102 and run a series of queries to retrieve the data from the customer support database 102. The defect analysis application 122 can then transform or convert the data from the customer support database 102 into a form that is compatible with the defect analysis database 124. The defect analysis application can then input the data into the defect analysis database 124. The defect analysis database 124 can also be implemented in various ways. For example, it can be a relational database, a collection of individual files or a combination of the two.

At stage B, the defect analysis system 120 analyzes the data to determine the relationships among the various pieces of data. The techniques used to determine the relationships will vary between implementations and between data sources. For example, the software component metadata database 114 can contain information that describes the relationships between various software components, such as dependencies. Thus, the defect analysis system 120 can utilize these pre-determined relationships.

The customer support database 102 can contain entries describing reported defects as well as the solutions to the defects. There may be no pre-determined relationships between entries in the customer support database 102, thus the defect analysis system 120 can use techniques such as a type of textual analysis to determine which entries are related to each other. For example, there may be two different entries in the customer support database 120 that describe a defect with handling a particular font. The entries may pertain to two completely different software applications that are handled by two different support teams, and thus any relationship may go unnoticed by the support engineers from the two different support teams involved. But a textual analysis done by the defect analysis system 120 might establish that the two entries are related based on keywords, APIs, terms or language used in problem descriptions.

The version control repository 106, as described above, can contain a set of files containing computer code, but without any explicitly defined relationships. Even though the version control repository 106 does not contain explicitly defined relationships, the actual code in the files may contain relationships, such as code dependencies. For example, a file associated with one software component may reference a file of source code associated with another software component. The defect analysis system 120 can be implemented in such a way as to recognize a source code dependency as a relationship. The set of build scripts 110 can include similar relationships. For example, a build script in the set of build scripts 110 might contain an instruction that results in the building of a first software component prior to building a second software component. Thus, the defect analysis system 120 might establish that the first software component is a dependency of the second software component.

Relationships can be established by using information from multiple data sources as well. For example, data from multiple sources can be linked to create a more complex graph of relationships. The defect analysis system 120 may recognize a relationship between a first and a second software component defined in the software component metadata database 114. The customer support database 102 can include a list of files that were modified in order to fix a particular defect. The defect analysis system 120 might recognize that a file related to the second software component was modified along with a file related to a third software component to fix the defect. Thus, the defect analysis system 120 might establish that there is a relationship between the first software component and the third software component that is not explicitly defined anywhere.

Various methods can be used to determine the relationships between the various pieces of data. For example, cluster analysis on apparently unrelated data can be utilized to determine that relationships exist between the data. One implementation might ignore pre-defined relationships, and instead convert each individual textual entity (such as a file or database entry) into a point in a multi-dimensional space. The defect analysis system 120 can then analyze the generated clusters within the multi-dimensional space to determine relationships between the data. More specifically, applying a k-means clustering algorithm to the data can be effective in finding relationships between data that would be difficult for a person to recognize. Various other analysis techniques can be used or combined to potentially improve results and establish more relationships. Pre-determined relationships, such as those defined by a relational database, can be combined with relationships discovered using textual analysis and clustering analysis to produce more advanced results.

At stage C, the defect analysis system 120 provides indications to system participants, such as the customer support team 116, of the relationships between components. The indications can be provided through a user interface component of the defect analysis application 122. Additionally, multiple user interfaces can exist, with each one customized for use by a specific group of system participants. The user interface(s) can be built as a component of the defect analysis system 120, or can be built independently, communicating with the defect analysis system 120 via an API or other method.

In an example scenario, a member of the customer support team 116 views a first entry in the customer support database 102. The first entry includes relationship indications of other data that the defect analysis system 120 determined to be related to the first entry. For example, the user interface displays a set of other entries in the customer support database 102 that are related to the first entry. The customer support team 116 member views the customer support database 102 entries that are related to the first entry. The related entries provide additional information that allows the customer support team 116 member to find the possible solutions to the defect indicated in the first entry. For example, the customer support team 116 member views a second entry entered by a member of another customer support team that indicated a similar defect in another application. The second entry explains how the other member of the other customer support team fixed the defect. The customer support team 116 member then determines that the solution for the defect occurred in a low level component used by both applications. The customer support team 116 member then also determines that the application indicated in the first entry is using an outdated version of the low level component that does not include the fix indicated by the member of the other customer support team. Without the information provided by the defect analysis system 120, the customer service team 116 member might have spent significantly more time troubleshooting the defect.

A user interface for the defect analysis system 120 can allow users to view different sets of relationship for a particular piece of data. For example, the customer support team 116 member discussed above can be given the option of viewing the relationships between the first entry in the customer support database 102 and additional entries in the customer support database 102. The customer support team 116 member can also be given the option of viewing the relationships between the first entry and software components as determined by the defect analysis system 120. Being able to choose the types of relationships based on a variety of options allows the user to tailor their search according to the task at hand.

At stage D, a developer from the set of developers 108 commits a change to a source code file for a software component to the version control repository 106. Upon receiving the commit instruction and updated source code file, the version control repository 106 indicates to the defect analysis system 120 that a change has been made and provides the updated data. Using the updated data, the defect analysis system 120 determines which other components are related to the changed file, and notifies the appropriate system participants.

In an example scenario, the developer changes a setting in a first software component that specifies the number of bytes to use when generating a particular set of characters. For example, the developer changes the setting from two byte encoding to four byte encoding. Thus, any text generated by the first software component will change from a two byte encoding to a four byte encoding. The defect analysis system 120 determines that there are several relationships established between the changed first software component and other software components. For example, the defect analysis system 120 determines that other software components use the output from the first software component. If the other software components expect the output from the first software component to be encoded using two bytes, but the output is encoded in four bytes, defects may occur. The defect analysis system 120 determines that the other software components include the same setting, but are set to the old setting value. The defect analysis system 120 then indicates to the relevant system participants that the setting in the first software component was changed, alerting them that the other software components should be updated accordingly.

Similarly, the defect analysis system 120 can generate rules to be incorporated into other systems. For example, software may include build scripts that perform many different actions when building the software program. One action can be checking settings to ensure that the settings are compatible between different components of the software program. In the above example in which a developer changes the setting for the number of bytes used to encode text, the defect analysis system 120 can generate a rule to prevent a subsequent defect. The rule can cause an error or warning to be generated if a software component depends on the software component with the modified setting and has not been updated.

The version control repository 106 is described above as indicating changes to the defect analysis system 120 at stage D. In some implementations, the defect analysis system 120 queries the data sources at periodic intervals to determine the changes. For example, some data sources can be proprietary systems that cannot be changed, preventing changes to update the data sources to communicate to the defect analysis system 120. Thus, if the data source allows other software to communicate with it, the defect analysis system 120 can be implemented to request data from the data source at regular intervals. The defect analysis system 120 can then determine the changes since the previous query. Some data sources might not have a mechanism for direct communication with the defect analysis system 120 at all. Thus, data might be exported manually from the data source at regular intervals and imported into the defect analysis system 120.

It should be noted that although the examples and descriptions above discuss the defect analysis system 120 in a context that can be interpreted as applying to data sources and system participants that are part of the same business entity, the inventive subject matter is not so limited. For example, many software programs utilize libraries code from third party entities, such as open source software projects. The use of open source software presents both advantages and disadvantages. When a large number of other entities utilize the same open source software, the chance of someone discovering and fixing a defect increases. When a software program is developed completely within a single entity, it may be easier to develop processes to notify related stakeholders of changes, but when utilizing a software program from a third party, this becomes much more difficult. It may be cost or time prohibitive to monitor changes to third party products in order to determine whether a particular update would fix open defects or cause other defects. Thus, the defect analysis system 120 can be leveraged to allow an entity to better use third party software by establishing relationships and monitoring changes to the third party software. In other words, data associated with third party products, such as version control logs and defect reporting software can be utilized just as any other data source.

Figure 2:
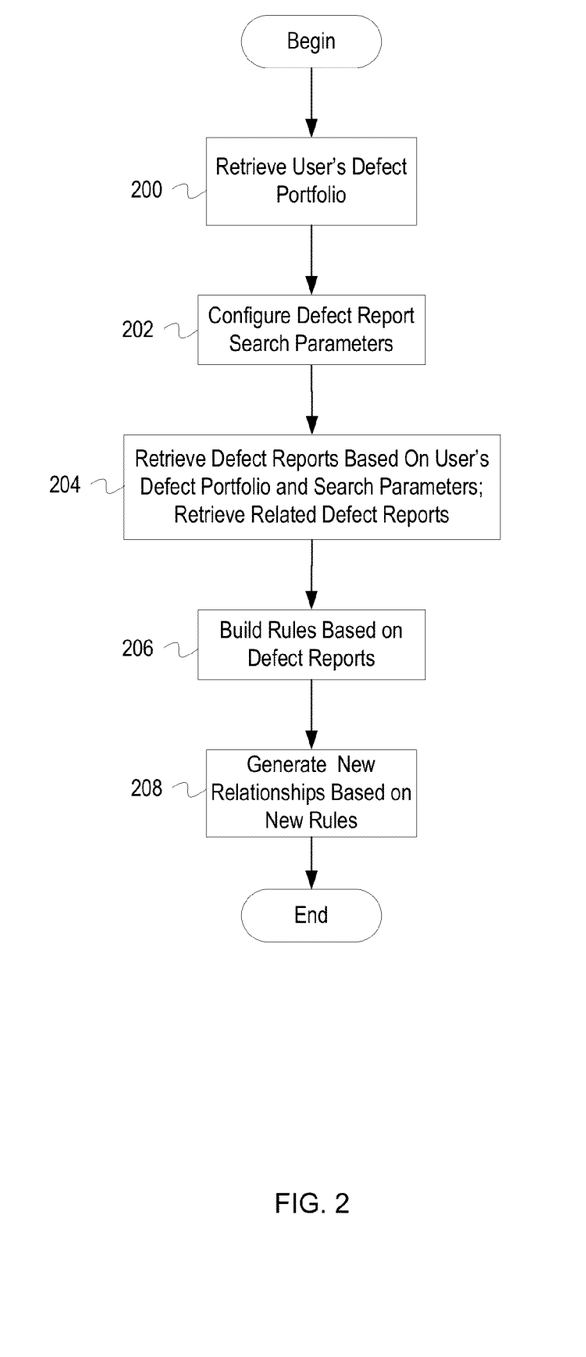
FIG. 2 depicts a flowchart of example operations on relationship and rule construction for use of a defect analysis system.

FIG. 2 depicts a flowchart of example operations on relationship and rule construction for use of a defect analysis system.

At block 200, the defect analysis system retrieves the defect portfolio for a user accessing the defect analysis system. The user can access the defect analysis system in a variety of ways, such as through a web interface or application utilizing an API, as described above. A defect portfolio comprises defect reports. The user's defect portfolio can include open defect reports assigned to the user, closed defect reports assigned to the user, defect reports that the user has permission to see, defects related to a team the user is assigned to, etc. The scope of a user's defect portfolio can vary between users. For example, a low level user may be restricted to only defects assigned to that user. However, a high level user may have access to all defects, whether assigned to them or not. Different implementations can define the defect portfolio in different ways. In general, the user's defect portfolio is a set of defect reports that are most relevant to the user, as determined by the implementation. After retrieving the user's defect portfolio, control then flows to block 202.

At block 202, the user configures defect report search parameters. For example, the user may have the choice of selecting various options to filter the defect reports in the defect portfolio. For example, the user may restrict the defect reports to ones that are open, ones related to certain a problem and/or solution, or ones related to a particular software component. The user may also have the option to search for keywords or generating text queries including operators like Boolean operators. After configuring the defect report search parameters, control then flows to block 204.

At block 204, the defect analysis system retrieves defect reports based on the user's defect portfolio and search parameters, as well as retrieving related defect reports. Typically, the defect analysis system determines a first set of defect reports based on the user's defect portfolio and search parameters. Then the defect analysis system determines a second set of defect reports that are related to the defect reports in the first set of defect reports. As described above, related defect reports can be found using a variety of analytic techniques, such as cluster and statistical analysis. Implementations can vary. For example, the defect analysis system can determine the related defect reports based on the user's defect portfolio first, and then filter the defect reports based on the search parameters. The specific implementation can be influenced by factors including business requirements and the nature of the source data. After retrieving defect reports based on the user's defect portfolio and search parameters, as well as related defect reports, control then flows to block 206.

At block 206, rules are built based on the retrieved defect reports. The rules can be generated automatically. For example, the defect analysis system can determine that if a change is made to a first defect report, such as closing it, notifications are sent to the users assigned defect reports determined to be related to the first defect report. Additionally, rules can be created manually by the user. For example, the user may determine that the solution to a first defect report is the solution to a second defect report, and thus create a rule establishing the two defect reports as having the same solution. Establishing such a rule can be utilized by the defect analysis system to predict that a third defect report determined to be related to both the first and second defect report has the same solution. After building rules based on the retrieved defect reports, control then flows to block 208.

At block 208, the defect analysis system generates relationships based on the new rules. As described above, the relationships can be stored in a variety of forms. The rules can be used to generate new relationships independent of a rule or new relationships based on the rule. After generating relationships based on the new rules, the process ends.

Parts of the defect analysis described above can be embodied as a separate software application. For example, the operations in blocks 200, 202 and 204 might be performed using an existing defect tracking software application. The operations in blocks 206 and 208 could then be done utilizing the defect analysis system separately. The operations in blocks 206 and 208 could also be done using the existing defect tracking software application by integrating the existing defect tracking software application with the defect analysis system. Various operations above can be apportioned among various pieces of software or software applications, and each separate piece of software can be considered a part of the defect analysis system or separate from the defect analysis system.

Figure 3:
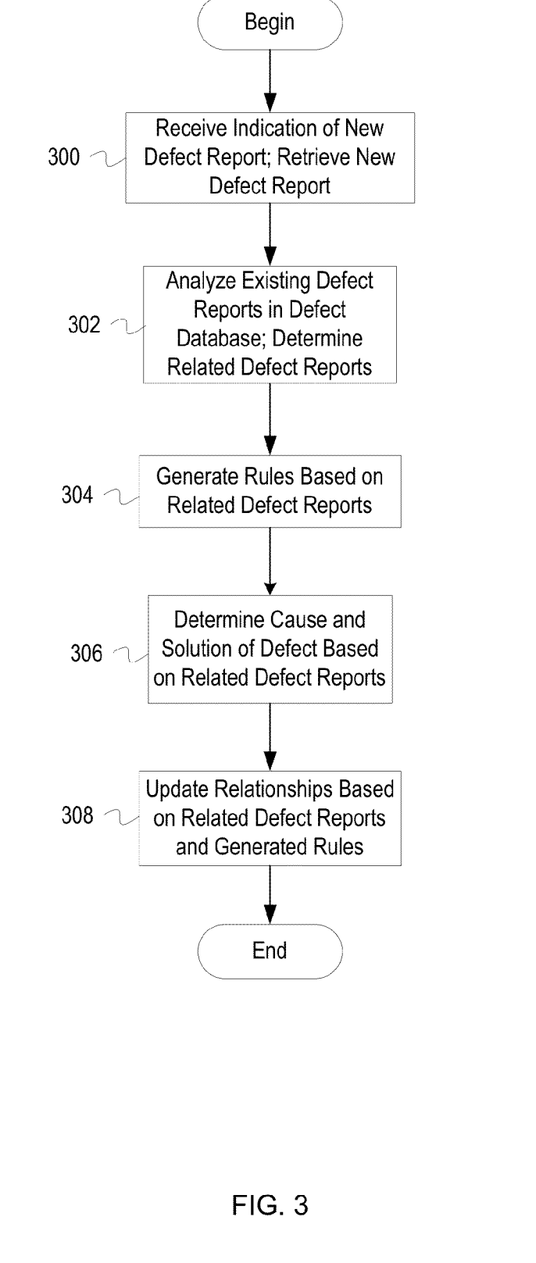
FIG. 3 depicts a flowchart of example operations in which a defect analysis system determines a problem cause(s) and solution(s) for a defect.

FIG. 3 depicts a flowchart of example operations in which a defect analysis system determines a problem cause(s) and solution(s) for a defect.

At block 300, the defect analysis system receives an indication of a new defect report and the new defect report is retrieved. In some implementations, the indication of the new defect report is the defect report itself. As described above, existing defect tracking systems can exist out of the defect analysis system. Thus, instead of receiving a defect report directly, the defect analysis system may just receive a notification indicating the existence of the new defect report. The defect analysis system can also retrieve new defect reports periodically, thereby not receiving a specific indication of the new defect report. After retrieving the new defect report, control flows to block 302.

At block 302, the defect analysis system analyzes existing defect reports in the defect database to determine defect reports that are related to the new defect report. The defect analysis system retrieves a set of defect reports from the defect database. Similar filters and search parameters can be used as when a user searches for defects. For example, a new defect report may specify a related component or the software application the defect occurred in, which the defect analysis system can use to filter existing defect reports. The defect analysis system can also determine keywords in the new defect report and filter the existing defect reports using the keywords. The defect analysis system determines related defect reports as described above. After determining related defect reports, control then flows to block 304.

At block 304, the defect analysis system generates rules based on the related defects. As described above, the defect analysis system can generate rules based on related defect reports, such as a rule that notifies the owners of related defect reports when the status of another defect report changes. After generating rules based on the related defects, control then flows to block 306.

At block 306, the defect analysis system determines the cause of the defect and the solution for the defect. The defect analysis system can accomplish this by analyzing the relationships and rules among the related defect reports. As described above, rules and relationships can be generated based on defects that have shared solutions. If the analysis of the related defects shows that they have the same solution, the defect analysis can suggest the solution for the new defect report. After determining the cause and solution for the defect, control then flows to block 308.

At block 308, the defect analysis system updates relationships based on the related defect reports and generated rules. As described above, the defect analysis system stores relationships in a database. When new relationships are determined or old relationships are removed, the defect analysis system updates the database in which the relationships are stored. After updated the relationships based on the related defect reports and generated rules, the process ends.

Figure 4:
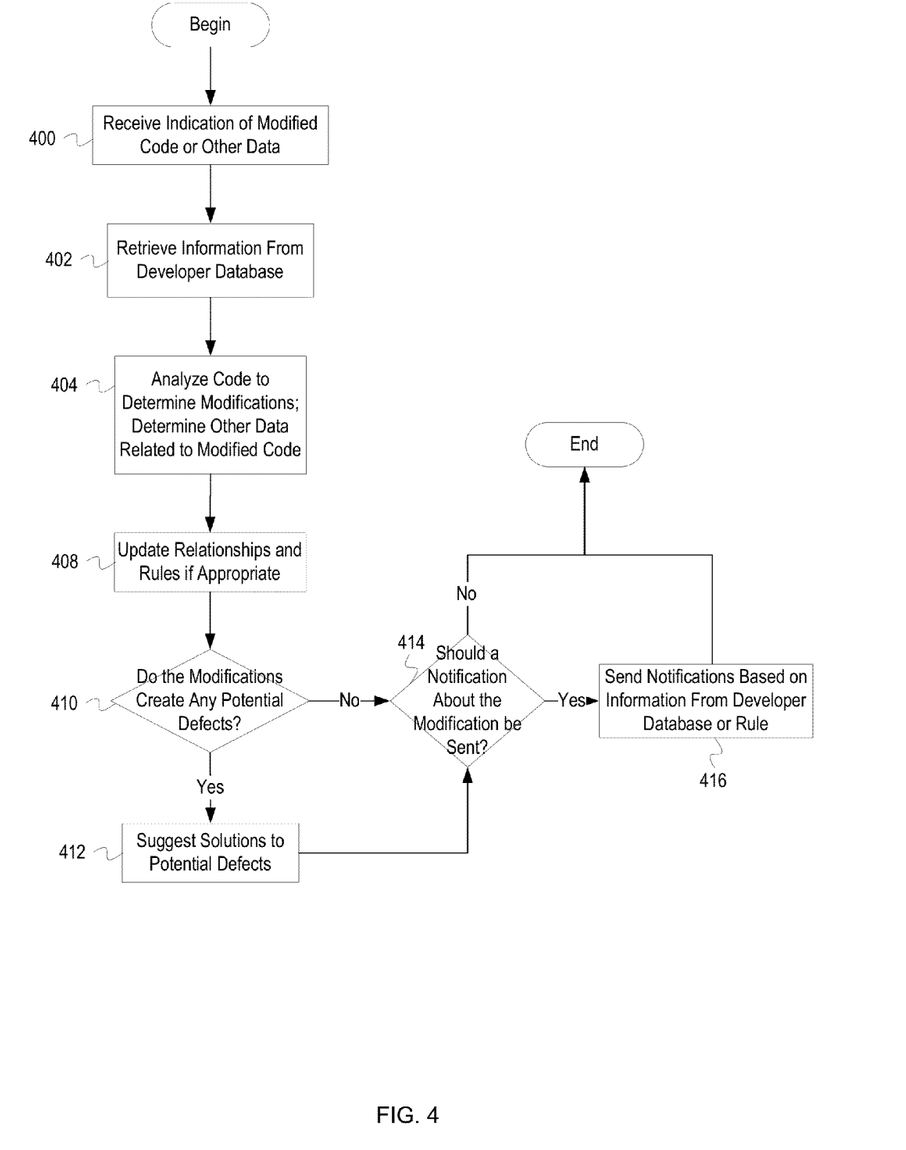
FIG. 4 depicts a flowchart of example operations in which a defect analysis system prevents defects.

FIG. 4 depicts a flowchart of example operations in which a defect analysis system prevents defects.

At block 400, the defect analysis system receives an indication that a piece of data, such as computer code, has been modified. For example, a developer checks a source code file into a version control repository after modifying the source code or an existing defect report is closed. The indication that the piece of data has been modified may be the updated data, a representation of the updates, the old and new data, just an indication that data changed, etc. If the data is not included in the indication, the defect analysis system retrieves the updated data. Some data sources, as described above, cannot be modified to notify the defect analysis system when data changes, thus the defect analysis system can be implemented to check for updates periodically. For the purpose of this example, it will be assumed that the modified data is computer code. Some operations may not apply to different types of data, while additional operations may be performed for different types of data. After receiving an indication of the modified code, control then flows to block 402.

At block 402, the defect analysis system retrieves information from a database of developers. The information can contain details about the roles of the developers, what projects they are assigned to, particular areas of expertise, etc. After retrieving information from a database of developers, control then flows to block 404.

At block 404, the defect analysis system analyzes the modified code to determine what changes were made and determines what data is related to the modified code. The modifications are used by the defect analysis system to determine what other pieces of data are impacted by the modification. The defect analysis system determines what other pieces of data are related to the modified code, either by analyzing the data as described above or querying the database that stores details about the relationships among the pieces of data. After determining related data, control then flows to block 408.

At block 408, the defect analysis system updates relationships and rules if appropriate. For example, code modifications can remove dependencies, such that the modified code is no longer related to the other software component. Similarly, code modifications can add dependencies, thus the defect analysis system updates the relationships to include the new dependency. Rules based on the relationships are updated as described above. After updating relationships and rules as appropriate, control then flows to block 410.

At block 410, the defect analysis system determines if the modifications create any potential defects. For example, if a function is modified to return a different type of value, such as changing the return type from an "int" to a "char," any code that calls that function may subsequently fail. Thus, utilizing the relationships among the data, the defect analysis system can determine whether the changes to the code create potential defects. Additionally, the defect analysis system can utilize rules to determine if the modifications create any potential defects. For example, a rule may exist that determines that a particular change can cause a particular defect. The defect analysis system would recognize the change as creating a potential defect. If the defect analysis system determines that the modifications create any potential defects, control then flows to block 412. If the defect analysis system determines that the modifications do not create any potential defects, control then flows to block 414.

At block 412, the defect analysis system suggests possible solutions to the potential defect. For example, if a rule specifies that the particular modification can lead to a particular defect, the defect analysis system may suggest a solution based on related defect reports. Also, as will be described in detail below, certain components of a font refer to each other. A rule can exist that suggests the developer verify that the other components have been properly updated. Or, a rule can exist that allows the defect analysis system to verify the references are correct itself and only notify the developer (or other responsible party) if the references are not correct. After suggesting solutions to the potential defects, control then flows to block 414.

Control flowed to block 414 if the defect analysis system determined that the modifications did not result in any potential conflicts. Control also flowed to block 414 from block 412. At block 414, the defect analysis system determines whether a notification about the modification should be sent. The defect analysis system can determine this based on rules and relationships or other data, such as the developer database. For example, if all data related to the changed file are within the same project, the defect analysis system might determine that no notifications are necessary. If the changed file is related to another project, which may be handled by an entirely different team, the defect analysis system might determine that the other team should be notified. Additionally, rules can be created that determine notifications should be made when certain data is modified. For example, a rule might be created that specifies a notification is to be sent anytime a specific core file is modified because of a high risk of defects. If the defect analysis system determines that a notification should be sent, control then flows to block 416. If the defect analysis system determines no notification should be sent, the process ends.

At block 416, the defect analysis system sends notifications based on information from the developer database or a rule. For example, the defect analysis system determined the related components at block 404. The defect analysis system can then use the data retrieved from the developer database to determine the person responsible for a particular project that includes a related file. Thus, the defect analysis system can then determine the contact information for the responsible person and send then a notification of the modification. After the notifications are sent, the process ends.

Figure 5:
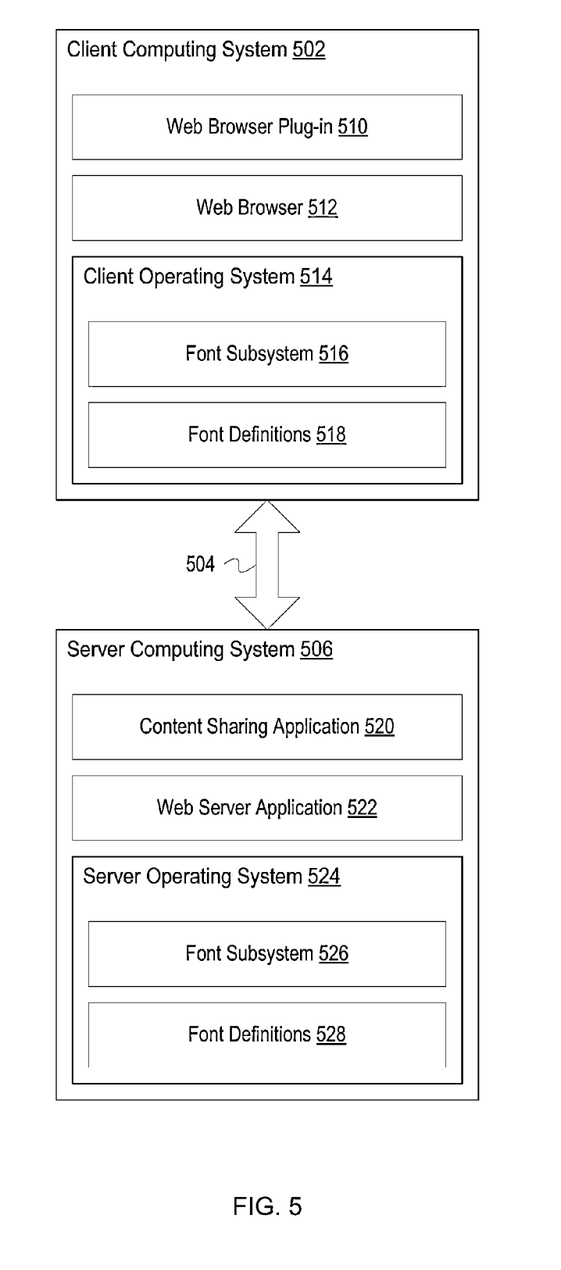
FIG. 5 is an example diagram depicting a subset of the software layers used in a web browser-based content sharing application.

FIG. 5 is an example diagram depicting a subset of the software layers used in a web browser-based content sharing application. FIG. 5 includes a client computing system 502, a network connection 504 and a server computing system 506. The client computing system 502 includes a web-browser plug-in 510, a web browser 512 and a client operating system 514. The client operating system includes a font subsystem 516 and font definitions 518. The server computing system 506 includes a content sharing application 520, a web server application 522 and a server operating system 524. The server operating system includes a font subsystem 526 and font definitions 528.

In an example scenario, a support engineer receives a report of a defect from a user. The user is attempting to use a web-based collaboration tool to view a document a coworker has put on the server. When viewing the document though, the user sees incorrect text characters, such as symbols where English letters should be or empty square boxes.

The support engineer can start by doing some quick troubleshooting first, such as verifying the versions of the software being used on the client computing system 502. For example, the support engineer might ask the user to determine the version of the web browser plug-in 510, knowing that an outdated version might cause the problem. The support engineer might then verify that the use has the proper fonts installed by verifying the existence of the proper font definition in the font definitions 518.

If the support engineer verifies everything above as being correct, the next step is to start engaging support engineers that deal specifically with certain layers. For example, the support engineer creates or assigns a ticket to a support engineer on the team that handles defects in the specific web-browser plug-in 510 used in this application. The web-browser plug-in 510 support team has a high workload or gives the defect a low priority, and thus takes days or weeks to troubleshoot the defect. Once the web-browser plug-in 510 support team begins troubleshooting the defect, they determine that the problem is bad data being received from the next layer, the web browser 512. Thus, the defect is passed on to another support engineer or team to determine if the defect occurs in the web browser 512 or somewhere else.

Eventually, potentially after weeks or months of troubleshooting the various layers, a developer determines that the font definition that exists in the font definitions 528 on the server has an error in it. The developer who determines this also determines that the font definition at issue has been corrected, but has not been incorporated into the server operating system 524 that runs on the server computing system 506. The team responsible for the server operating system 524 is notified, and updates the next version of the server operating system 524. Thus, when the next version of the server operating system 524 is released, and eventually installed on the server computing system 506, the defect is fixed.

The defect analysis system can reduce the amount of time it takes for a solution to a defect to be found and for a solution to a defect to be implemented. In the above example, the developer determined that the font definition error had already been corrected. One reason this might have been is because a similar defect appeared in a different application that utilized the same font definition. The defect analysis system might have recognized the relationship between the new defect report and the one that resulted in the corrected problem. If the initial support engineer had been aware of the related defect report, s/he may have immediately requested that someone verify the version of the font definition included in the server operating system 524. This could have resulted in less time troubleshooting, not only in determining the cause of the defect sooner but also reducing the work load on each team involved.

Even if the defect had not shown up elsewhere, the defect analysis system might have been able to determine that the solution already existed. For example, the incorrect font definition was, at some point, committed into a version control repository. It is possible that the developer committed the incorrect version to version control without testing it, then later, testing some other aspect of his work that revealed the defect. But, in between the time the developer committed the incorrect version to version control and found his mistake, the incorrect font definition was incorporated into the server operating system 524, unbeknownst to the developer. However, when the developer fixed the problem, s/he may have described the problem and fix in the version control logs associated with committing the corrected version to version control. Because these version control logs can be a data source for the defect analysis system, the defect analysis system could discover the relationship between the version control log entry and the new defect report.

The defect analysis system can also help prevent the defect in the first place. As described above, it is possible that the server operating system 524 happened to incorporate the incorrect version of the font definition. When the corrected version was committed to version control, the developer might have labeled the commit as "critical." The defect analysis system might recognize that files committed with the "critical" label should have a rule generated that prevents builds with an older version of the file. Thus, the defect analysis system generates a rule in this scenario that is incorporated into the build scripts. During the build process of the server operating system 524, the build tool determines that the server operating system 524 is recognizing an older version of the font definition than the corrected version. Thus, the build tool halts the build process and alerts the build team, who investigates the change, the potential impact of using the new font definition and incorporates the new font definition into the latest version of the server operating system 524. Thus, the defect is fixed in the server operating system 524 prior to the user submitting a defect report.

As described above, the defect analysis system generates rules to help prevent defects based on the relationships among the data. Some relationships can be embodied as rules and some rules as relationships. As described above, a specific type of relationship, such as a dependency relationship between two software components, can lead to a specific action based on an event. For example, in the aforementioned dependency relationship, a change to the independent software component may be an event that triggers an action, such as a notification to a particular user. Fixing a defect can yield many such rules, as illustrated by expanding the example discussed above regarding the incorrect font definition.

Figure 6:
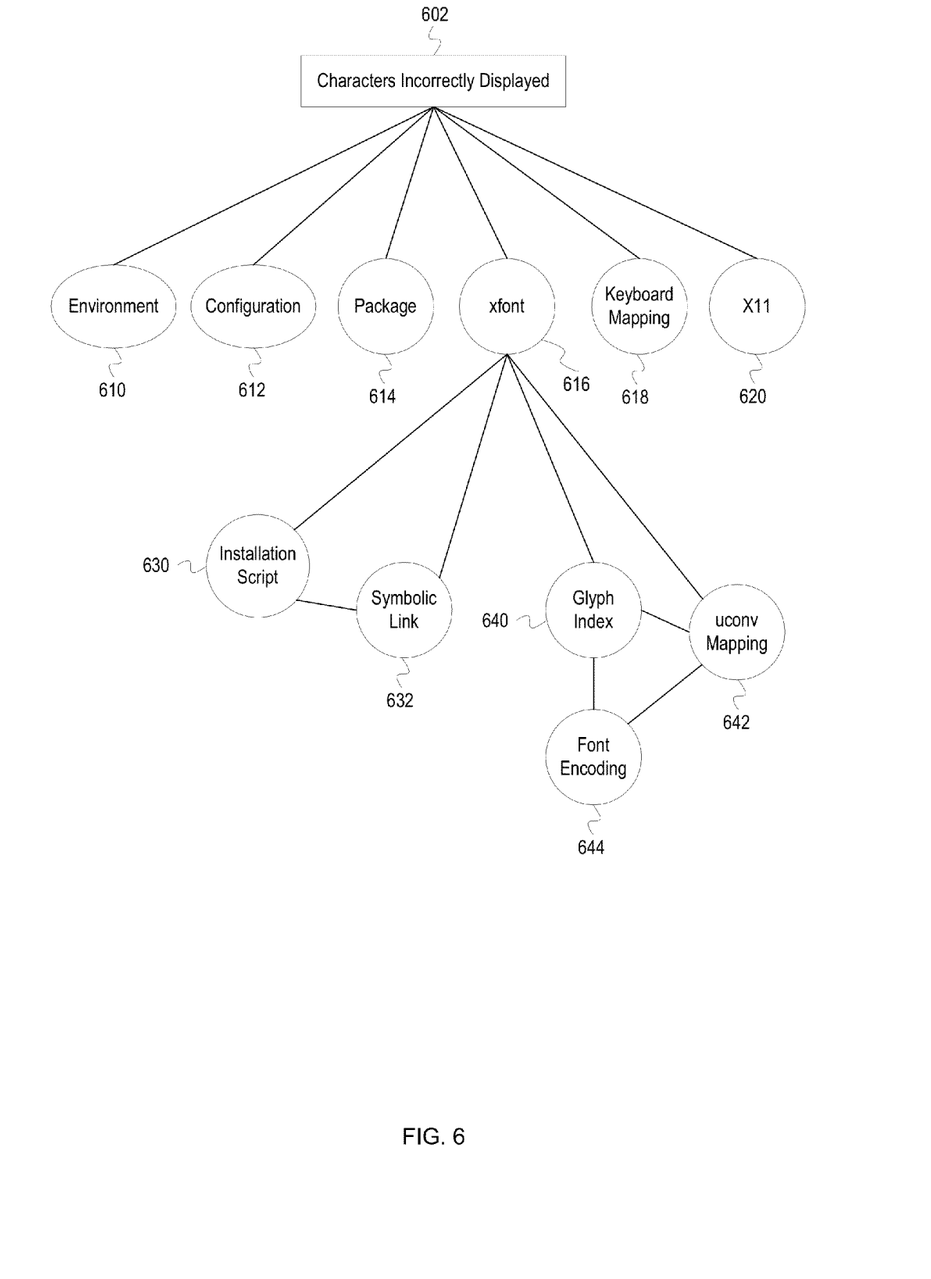
FIG. 6 depicts a defect and a set of relationships between the components that might be implicated in causing the defect.

FIG. 6 depicts a defect and a set of relationships between the components that might be implicated in causing the defect. FIG. 6 depicts a defect 602, which may be caused by a set of components 610-620. FIG. 6 also depicts a set of components 630, 632 and 640-644 that are impacted by a fix for the defect 602. Each edge between components represents a relationship.

When a report of the defect 602 comes in, a support engineer may have to determine which components may cause the defect 602. A single defect can oftentimes be caused by any one of a number of software components. In this example, six various software components of an example system that could cause the defect 602 are depicted. Depending on the actual software implementation, more or less software components can be a potential cause of the defect 602. Each edge between the defect 602 and each software component indicates a dependency relationship. The software component that is incorrectly displaying the characters depends on each software component by either using it directly or indirectly. For example, X11 620 is a software component that facilitates the drawing of graphics, such as windows and text, on a computer screen. The software that is displaying characters incorrectly might utilize a graphical user interface library that is based on X11 620. Thus, even though the defective software component does not directly depend on X11 620, it indirectly depends on it.

In this example, a support engineer narrows the problem to the xfont 616 software component. In particular, the support engineer determines that a collection of fonts within the xfont 616 software component specify multiple glyph indexes, creating conflicts. In order to fix the defect, the support engineer determines that the duplicative indexes should be removed, leaving only one index. In order to make this change, the glyph index 640 for the affected fonts in the font collection is updated. The change to the glyph index 640 may impact the font encoding 644, resulting in a change to the encoding mapping. Further, the uconv mapping 642 is updated to remap both the glyph index 640 and font encoding 644. Thus, the edges between the glyph index 640, uconv mapping 642 and encoding 644 represent more dependency relationships.

After making changes to the font files, further changes may be made to provide the xfont 616 software component access to the fonts. For example, the xfont 616 software component may be configured to retrieve a font from a particular location. Because fonts may be organized separately from other files, a symbolic link 632 can be put in the location the xfont 616 software component retrieves a font from, redirecting the xfont 616 software component to the appropriate font file. Thus, if a new version of the font is created, the symbolic link 632 is updated to reflect the new version. Finally, the installation script 630 may be updated to correctly reflect the proper symbolic link 632. Software components such as the xfont 616 software component and the font files may be installed separately. Once both components are installed, the installation script 630 can modify the default xfont 616 software component installation by copying or creating the proper symbolic link 632 to the proper font files.

Each of these steps, represented by the edges between the components, exhibit some form of dependency relationship and may be used to generate a rule. For example, recognition that more than one glyph index 640 can create conflicts can generate a rule that verifies each font only has one glyph index

640. When a change occurs to the font encoding 644, a rule can be generated to notify the person making the change that the change may impact the glyph index 640 and the uconv mapping 642 and vice versa. Or, the rule can be generated to notify a person determined to be responsible for the respective software components. Or, a rule can be generated to actually verify that the glyph index 640 and uconv mapping 642 correspond to the font encoding 644 as expected. Many variations of rules can be created depending on the capabilities of the defect analysis system, as illustrated.

It can be instructive to examine the potential impact of a single rule. As described above, the troubleshooting of a single defect may take weeks or months before a problem is found and the fix is installed in the defective system. Thus, many man-hours may be spent on one particular issue, as well as potential lost productivity because of the software defect. Thus, using discovered relationships to create rules to verify and check complex software as well as notifying appropriate people of changes and other event can reduce the amount of time spent troubleshooting related issues. Even though the particular issue encountered may not happen again, the additional rules created can prevent other defects as well. Furthermore, the person in charge of updating the uconv mapping 642 may not know that the change has an impact on the team responsible for the installation script 630. The defect analysis system can discover these complex relationships that can be difficult for a person to understand. Thus, the defect analysis system might notify a team across the world that a single, minor change may have an impact on something they are responsible for.

Although specific examples of various analysis techniques are given above, such as k-means clustering, the inventive subject matter is not so limited. There are many different algorithms that exist that might be advantageous in specific implementations. For example, k-means clustering is only one of many clustering techniques, which include hierarchical clustering techniques, distribution-based clustering and density-based clustering. Further, clustering is only one way to determine relationships between pieces of data. For example, other forms of spatial or statistical analysis can be used.

As example flowcharts, the flowcharts depicted above present operations in an example order from which embodiments can deviate (e.g., operations can be performed in a different order than illustrated and/or in parallel). For example, FIG. 4 is described in relation to a modification of code, such as a developer changing a source code file. However, the operations can apply to other types of data, and some operations may not apply to some types of data, while the process for other types of data may include other operations.

Furthermore, the examples above may be simplified. For example, in general, the examples refer to single sources of data when discussing relationships and rules. Data sources can be combined to create relationships and rules, and rules and relationships can exist between different types of data. For example, in FIG. 3 at block 306, the defect analysis system determines the cause of a defect and a potential solution. It is described as determining the cause and solution based on related defect reports. However, different types of data may be referred to. For example, a version of a software component may have been released for use with a latent defect. Prior to the latent defect being discovered by an end user, a developer working on the software components finds the defect and fixes it. When checking in the corrected file, the developer describes the defect in the version control log. Subsequently, a new defect report is entered that describes a similar bug. The defect analysis system can be implemented to recognize that the version control log entry is related to the new defect report, and that the solution is to update the file related to the version control log entry.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory, propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
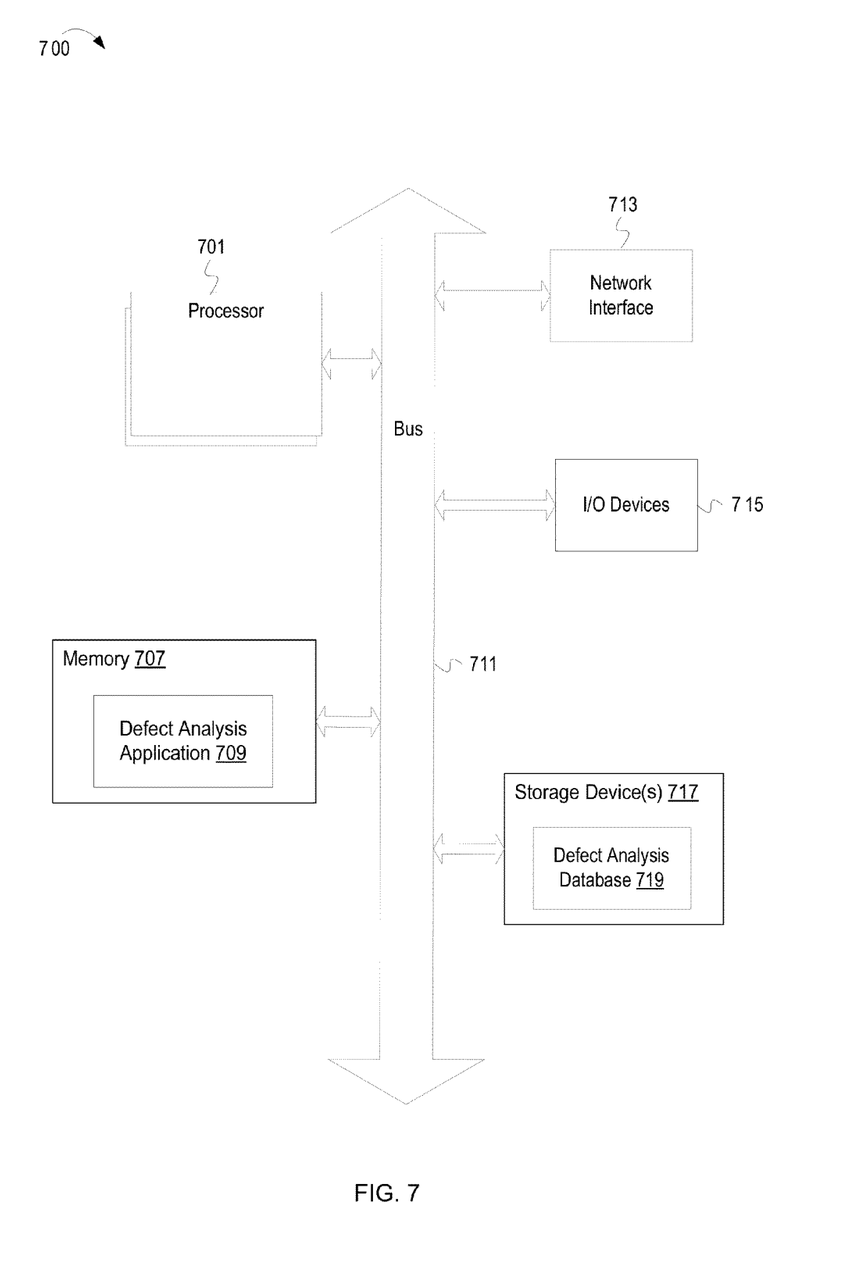
FIG. 7 depicts an example computer system including a defect analysis system, which includes a defect analysis application and a defect analysis database.

FIG. 7 depicts an example computer system including a defect analysis system, which includes a defect analysis application and a defect analysis database. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 711 (e.g., PCI, ISA, PCI-Express, HyperTransport®, InfiniBand®, NuBus, etc.), a network interface 713 (e.g., an ATM interface, an Ethernet interface, a Frame Relay interface, SONET interface, wireless interface, etc.), and a storage device(s) 717 (e.g., optical storage, magnetic storage, etc.). The computer system also includes one or more I/O devices 715. The computer system also includes a defect analysis application 709 and a defect analysis database 719. The defect analysis application 709 and defect analysis database 719 embody functionalities to analyze data sources to determine relationships between the data. The defect analysis application 709 and defect analysis database 719 also embody functionality to utilize the determined relationships to reduce time and effort related to determining the cause of defect and preventing defects. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Additionally, the defect analysis application 709 can be embodied, in part or in whole, on the storage device(s) 717, and the defect analysis database 719 can be embodied, in part or in whole, in the memory 707. Further, realizations may include fewer or additional components not illustrated in FIG. 7 (e.g., video cards, audio cards, additional network interfaces, peripheral devices, etc.). The processor unit 701, the storage device(s) 717, and the network interface 713 are coupled to the bus 711. Although illustrated as being coupled to the bus 711, the memory 707 may be coupled to the processor unit 701.

While the embodiments are described with reference to various implementations and exploitations, it will be understood that these embodiments are illustrative and that the scope of the inventive subject matter is not limited to them. In general, techniques for analyzing data to reduce the effort involved in troubleshooting software defects and reduce the number of software defects as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    analyzing a first set of data associated with a plurality of data sources to determine a plurality of relationships among the first set of data;
    storing indications of the plurality of relationships among the first set of data;
    generating first rules based, at least in part, on the first set of data associated with the plurality of data sources, wherein a first of the first rules indicates a first software defect and a cause of the first software defect, wherein a second of the first rules indicates a solution to the first software defect;
    receiving an indication of a second software defect;
    determining that the solution to the first software defect is a possible solution to the second software defect based, at least in part, on the first of the first rules and the second of the first rules;
    receiving an indication that first data associated with the plurality of data sources has been modified;
    determining a relationship between the first data and second data associated with the plurality of data sources, wherein the relationship indicates the possibility that the modification of the first data impacts the second data; and
    responsive to the determining the relationship between the first data and the second data, determining and indicating a modification to at least one of the first data, the second data, or third data associated with the plurality of data sources, wherein the modification reduces the possibility that the modification of the first data will impact the second data.

2. The method of claim 1, further comprising:
analyzing a second set of data associated with the plurality of data sources, wherein the second set of data is related to the second software defect; and
generating second rules based, at least in part, on the second set of data associated with the plurality of data sources.

3. The method of claim 2, wherein determining that the solution to the first software defect is a possible solution to the second software defect comprises:
determining a relationship between the first software defect and the second software defect based, at least in part, on the first rules and the second rules.

4. The method of claim 1, further comprising:
identifying a user of a plurality of users as being associated with the first data; and
responsive to said identifying the user of the plurality of users, indicating, to the user of the plurality of users, that the modification of the first data has a possibility of impacting the second data.

5. The method of claim 1, further comprising:
generating a constraint on a process, wherein the constraint reduces the possibility of the occurrence of a software defect, wherein the constraint is based, at least in part, on a third of the first rules.

6. The method of claim 1, wherein analyzing the first set of data associated with the plurality of data sources comprises:
partitioning the first set of data associated with the plurality of data sources, wherein the plurality of relationships among the first set of data is determined based, at least in part, on the partitioning of the first set of data associated with the plurality of data sources, wherein a partition of the first set of data indicates a cluster of software defects.

7. A method comprising:
determining, by a computing system, sets of interrelated data;
receiving, by the computing system, an indication of a modification of first data associated with a first of the sets of interrelated data;
determining, by the computing system, that the modification of the first data associated with the first of the sets of interrelated data might result in a software defect in second data associated with a second of the sets of interrelated data based, at least in part, on relationships among the sets of interrelated data; and
indicating that the modification of the first data associated with the first of the sets of interrelated data might result in the software defect in the second data associated with the second of the sets of interrelated data, wherein indicating that the modification of the first data associated with the first of the sets of interrelated data might result in the software defect in the second data associated with the second of the sets of interrelated data comprises:
identifying a user associated with the second data associated with the second of the sets of interrelated data; and
transmitting, to the user, a notification indicating that the modification of the first data associated with the first of the sets of interrelated data occurred.

8. The method of claim 7, wherein the sets of interrelated data are determined based, in part, on at least one of statistical analysis, spatial analysis, cluster analysis and textual analysis.

9. The method of claim 7, further comprising:
generating a rule based, at least in part, on the relationships among the sets of interrelated data.

10. A computer program product comprising:
a computer readable storage medium having computer usable program code embodied therewith, the computer usable program code comprising computer usable program code to,
analyze a first set of data associated with a plurality of data sources to determine a plurality of relationships among the first set of data;
store indications of the plurality of relationships among the first set of data;
generate first rules based, at least in part, on the first set of data associated with the plurality of data sources, wherein a first of the rules indicates a first software defect, wherein a second of the first rules indicates a solution to the first software defect;
receive an indication of a second software defect;
determine that the solution to the first software defect is a possible solution to the second software defect based, at least in part, on the first of the first rules and the second of the first rules;
receive an indication that first data associated with the plurality of data sources has been modified;
determine a relationship between the first data and the second data associated with the plurality of data sources, wherein the relationship indicates the possibility that the modification of the first data impacts the second data; and
responsive to a determination of the relationship between the first data and the second data, determine and indicate a modification to at least one of the first data, the second data, or third data associated with the plurality of data sources, wherein the modification reduces the possibility that the modification of the first data will impact the second data.

11. The computer program product of claim 10, wherein the computer usable program code further comprises computer usable program code to:
analyze a second set of data associated with the plurality of data sources, wherein the second set of data is related to the second software defect; and
generate second rules based, at least in part, on the second set of data associated with the plurality of data sources.

12. The computer program product of claim 11, wherein the computer usable program code to determine that the solution to the first software defect is a possible solution to the second software defect comprises computer usable program code to:
determine a relationship between the first software defect and the second software defect based, at least in part, on the first rules and the second rules.

13. The computer program product of claim 10, wherein the computer usable program code further comprises computer usable program code to:
identify a user of a plurality of users as being associated with the first data; and
responsive to identification of the user of the plurality of users, indicate, to the user of the plurality of users, that the modification of the first data has a possibility of impacting the second data.

14. The computer program product of claim 10, wherein the computer usable program code further comprises computer usable program code to:

generate a constraint on a process, wherein the constraint reduces the probability of the occurrence of a software defect, wherein the constraint is based, at least in part, on a third of the first rules.

15. The computer program product of claim 10, wherein the computer usable program code to analyze the first set of data associated with the plurality of data sources comprises computer usable program code to:

partition the first set of data associated with the plurality of data sources, wherein the plurality of relationships among the first set of data is determined based, at least in part, on the partitioning of the first set of data associated with the plurality of data sources, wherein a partition of the first set of data indicates a cluster of software defects.

16. An apparatus comprising:

a processor; and a computer readable storage medium having program code stored therein that is executable by the processor to cause the apparatus to, analyze a first set of data associated with a plurality of data sources to determine a plurality of relationships among the first set of data;

store indications of the plurality of relationships among the first set of data;

generate first rules based, at least in part, on the first set of data associated with the plurality of data sources, wherein a first of the rules indicates a first software defect, wherein a second of the first rules indicates a solution to the first software defect;

receive an indication of a second software defect;

determine that the solution to the first software defect is a possible solution to the second software defect based, at least in part, on the first of the first rules and the second of the first rules;

receive an indication that first data associated with the plurality of data sources has been modified;

determine a relationship between the first data and the second data associated with the plurality of data sources, wherein the relationship indicates the possibility that the modification of the first data impacts the second data; and responsive to a determination of the relationship between the first data and the second data, determine and indicate a modification to at least one of the first data, the second data, or third data associated with the plurality of data sources, wherein the modification reduces the possibility that the modification of the first data will impact the second data.

17. The apparatus of claim 16, wherein the program code further comprises program code executable by the processor to cause the apparatus to:

analyze a second set of data associated with the plurality of data sources, wherein the second set of data is related to the second software defect; and generate second rules based, at least in part, on the second set of data associated with the plurality of data sources.

18. The apparatus of claim 17, wherein the program code being executable by the processor to cause the apparatus to determine that the solution to the first software defect is a possible solution to the second software defect comprises program code executable by the processor to cause the apparatus to:

determine a relationship between the first software defect and the second software defect based, at least in part, on the first rules and the second rules.

19. The apparatus of claim 16, wherein the program code further comprises program code executable by the processor to cause the apparatus to:

identify a first of a plurality of parties as being associated with the first data; and responsive to identification of the first of the plurality of parties, indicate, to the first of the plurality of parties, that the modification of the first data has a possibility of impacting the second data.

20. The apparatus of claim 16, wherein the program code further comprises program code executable by the processor to cause the apparatus to:

generate a constraint on a process, wherein the constraint reduces the probability of the occurrence of a software defect, wherein the constraint is based, at least in part, on a third of the first rules.

21. The apparatus of claim 16, wherein the program code being executable by the processor to cause the apparatus to analyze the first set of data associated with the plurality of data sources comprises program code to:

partition the first set of data associated with the plurality of data sources, wherein the plurality of relationships among the first set of data is determined based, at least in part, on the partitioning of the first set of data associated with the plurality of data sources, wherein a partition of the first set of data indicates a cluster of software defects.

* * * * *